US008561034B2

(12) United States Patent  (10) Patent No.: US 8,561,034 B2
Belapurkar et al.  (45) Date of Patent: Oct. 15, 2013

(54) SOFTWARE FAULT INJECTION IN JAVA ENTERPRISE APPLICATIONS

(75) Inventors: Abhijit Belapurkar, Bangalore (IN); Ravindra Karanam, Bangalore (IN)

(73) Assignee: Infosys Technologies, Ltd., Bangalore (IN)

( * ) Notice: Subject to any disclaimer, the term of this patent is extended or adjusted under 35 U.S.C. 154(b) by 1557 days.

(21) Appl. No.: 11/812,988

(22) Filed: Jun. 22, 2007

(65) Prior Publication Data

US 2008/0134160 A1 Jun. 5, 2008

(30) Foreign Application Priority Data

Jun. 22, 2006 (IN) .......................... 1062/CHE/2006

(51) Int. Cl.
*G06F 9/44* (2006.01)
(52) U.S. Cl.
USPC .......................................... 717/130; 717/118
(58) Field of Classification Search
USPC ................................. 717/118, 130
See application file for complete search history.

(56) References Cited

U.S. PATENT DOCUMENTS

2004/0049769 A1* 3/2004 Lueh et al. ..................... 717/158
2007/0088756 A1* 4/2007 Bruun ........................... 707/200

OTHER PUBLICATIONS

George Candea et al., "Automatic Failure-Path Inference: A Generic Introspection Technique for Internet Applications", Jun. 2003.*
Mark Fleury et al., "JBoss 4.0—The Offical Guide", Apr. 20, 2005.*
Lucian Gabor et al., "Using Aspect Oriented Programming for Performance Improving of J2EE Applications", 2004, Periodica Politechnica, vol. 49 (63).*

* cited by examiner

*Primary Examiner* — Wei Zhen
*Assistant Examiner* — Lanny Ung
(74) *Attorney, Agent, or Firm* — LeClairRyan, a Professional Corporation

(57) ABSTRACT

A method and system for injecting exceptions into a JAVA enterprise application during execution of the JAVA enterprise application is disclosed. The Java enterprise application includes multiple Enterprise JAVA Bean (EJB) classes. The EJB classes include one or more EJB methods. Each EJB is scanned for exceptions, and corresponding interface points of the EJB. The exceptions are automatically injected at the corresponding interface points based on scanning the EJB. The exceptions are then thrown to callers of the EJB methods. The exceptions are thrown before beginning execution of business logic of the EJB methods. Finally, the response of the JAVA enterprise application to the injected exceptions is analyzed.

21 Claims, 4 Drawing Sheets

SOFTWARE FAULT INJECTION IN JAVA ENTERPRISE APPLICATIONS

CROSS REFERENCE TO RELATED DOCUMENTS

This application claims priority under 35 U.S.C. §119 to Indian Patent Application Serial No. 1062/CHE/2006 of BELAPURKAR et al., entitled "SOFTWARE FAULT INJECTION IN JAVA ENTERPRISE APPLICATIONS," filed Jun. 22, 2006, the entire disclosure of which is hereby incorporated by reference herein.

BACKGROUND OF THE INVENTION

Field of the Invention

The present invention relates generally to software fault injection, and more particularly, to automatic fault injection in a JAVA enterprise application.

DISCUSSION OF THE BACKGROUND

Software Fault Injection (SFI) is a technique for observing in a controlled test environment how a given software system will behave under anomalous circumstances in a real-life environment. Therefore, the behavior of the software system under anomalous circumstances can be predicted by SFI techniques, thereby providing rich information on what needs to be changed to make the software more reliable.

In JAVA applications, operations and method calls generally indicate the presence of errors by throwing exceptions. When an exception is thrown, a JAVA Virtual Machine (JVM) onto which a JAVA application is loaded, searches for an appropriate exception handling code. A JAVA operation may be vulnerable to a variety of faults, and the exact exception generated may depend on both the fault and the operation. Further, the relationship between faults and exceptions can be one-to-many or many-to-one. It is also difficult to construct a mapping between faults and exceptions, on account of the layers of software between the JAVA application and the underlying hardware. In some cases, injecting a fault can cause an immediate exception, and therefore the program control transfers to the appropriate exception handling code for the operation that was being executed while the fault was activated. In some other cases, layering may delay the occurrence of the exception.

However, it is common knowledge that exception handling code is more likely to contain software bugs than any other part of the application. This is because the exceptions introduce significant complexity in the application's control flow, depending on their type and the point at which they are thrown. Also, the exception handling code is difficult to test because it is executed rarely, and may be triggered by a wide range of different error conditions. Further, some exceptions are inherently difficult to simulate and test for in a laboratory environment. The pressure for reducing time-to-market means that developers are prone to shipping codes with untested exception handling code. This is done in the hope that the exception is unlikely to happen, and that the exception handler will be capable of handling the exception in case it occurs.

Therefore, there is a need for an system and method for software fault injection in JAVA enterprise applications with improved exception handling techniques.

SUMMARY OF THE INVENTION

In accordance with an embodiment of the present technique, a method for injecting exceptions into a JAVA enterprise application during execution of the JAVA enterprise application is provided. The Java enterprise application has a plurality of Enterprise JAVA Beans (EJBs). Each EJB includes one or more EJB methods. The method includes scanning each EJB for exceptions, and corresponding interface points of the EJB. The exceptions are automatically injected at the corresponding interface points based on scanning the EJB. The exceptions are then thrown to at least one caller of the one or more EJB methods of the EJB. The exceptions are thrown before beginning execution of business logic of the one or more EJB methods of the EJB. The response of the JAVA enterprise application to the injected exceptions is analyzed.

In accordance with another embodiment of the present technique, a system for injecting exceptions into a JAVA enterprise application during execution of the JAVA enterprise application is provided. The Java enterprise application has a plurality of Enterprise JAVA Beans (EJBs). Each EJB includes one or more EJB methods. The system includes a workload generator, an application server, a database, and a controller. The workload generator generates workload for the JAVA enterprise application. The appropriately instrumented application server scans each EJB for exceptions and corresponding interface points of the EJB and helps in analyzing the response of the JAVA enterprise application to the exceptions that are injected into the JAVA enterprise application. The relational database stores the exceptions to be injected. The controller facilitates the automatic injection of the exceptions at the corresponding interface points based on scanning the EJB. The controller includes a JAVA Management Extension (JMX) interface for fine-grained control over the process of injecting the exceptions. Further, the controller facilitates the throwing of exceptions to at least one caller of the one or more EJB methods of the EJB. The exceptions are thrown before beginning execution of business logic of the one or more EJB methods of the EJB.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE PREFERRED EMBODIMENTS

The following description is full and informative description of the best method and system presently contemplated for carrying out the present technique which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

The present technique relates to a method and system for injecting exceptions in a Java enterprise application, such as a JAVA 2 Enterprise Edition (J2EE) application, during execution of the Java enterprise application. The Java enterprise application includes multiple Enterprise JAVA Beans (EJBs). Each EJB includes one or more EJB methods. During execution of the application, the application may be prone to various faults. The presence of such faults is indicated by exceptions that are thrown by the application. Each EJB method includes a throws clause for declaring the exceptions. The exception that is generated for a particular fault may depend on the fault, the operation, or both. For example, read and write operations that are exposed to faults produce the operating system error code 'NET_EAGAIN'. However, these faults may result in different exceptions, such as 'IOException' and 'SocketException' respectively. However, both the operating system error codes 'NET_EPIPE' and 'NET_EFAULT' can result in a Java 'SocketException'. Therefore, the mapping between faults and exceptions can be one-to-one, one-to-multiple, or multiple-to-one. Embodiments of the present technique work at the level of exceptions and not faults, thereby reducing system complexity.

Figure 1:
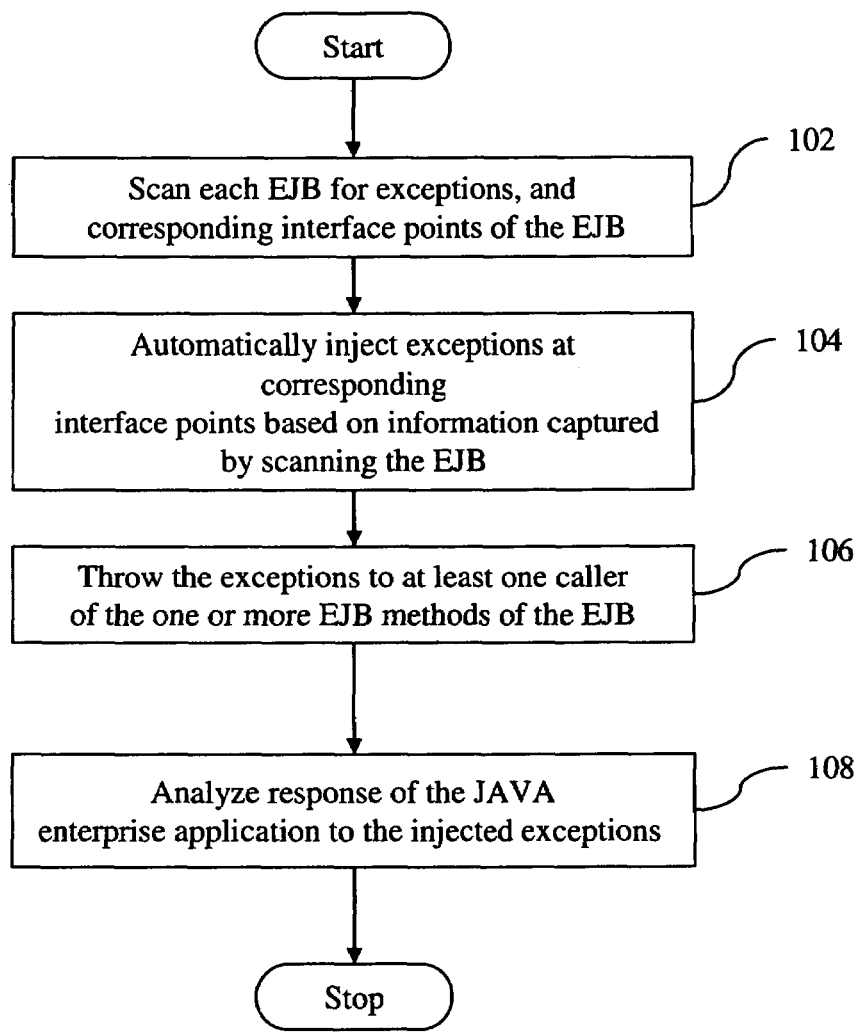
FIG. 1 is a flowchart depicting a method for injecting exceptions in a JAVA enterprise application in accordance with an aspect of the present technique.

FIG. 1 is a flowchart depicting the method for injecting exceptions in the Java enterprise application. At step 102, each EJB is scanned for exceptions, and corresponding interface points of the EJB. The scan results are captured and the corresponding captured information is stored, for example, in a database. The types of exceptions include checked and unchecked exceptions. Checked or declared exceptions refer to those exceptions that are declared by the throws clause of an EJB method. Unchecked exceptions are not declared by the throws clause of the EJB method. Examples of unchecked exceptions include, but are not limited to 'OutOfMemoryError', 'StackOverflowError', 'NullPointerException' etc. At step 104, the exceptions are automatically injected at the corresponding interface points. The injection is based on the information captured by scanning the EJBs in the application. At step 106, the exceptions are thrown to at least one caller of one or more EJB methods of the EJB. The exceptions are thrown before beginning execution of business logic of the one or more EJB methods of the EJB. At step 108, response of the JAVA enterprise application to the injected exceptions is analyzed.

The step of scanning 102 is performed to acquire information about the location of the injections, and which exceptions are to be injected at those locations during the execution of the EJB methods. For this purpose, the type of exceptions to be injected is determined. Further, the interface points at which the exceptions are to be injected are determined. For determining the type of exceptions, the checked and unchecked exceptions are identified. The EJB method can throw only those exceptions that are compatible with the ones declared in the throws clause of the EJB method, i.e., checked exceptions. For identifying the checked exceptions, information is gathered about each EJB method of all EJBs of the JAVA enterprise application. The EJB (B) is identified, for example, by determining the name of the EJB. Similarly, the methods (M) that constitute the public interface of the EJB, and the declared exceptions (E) for each method of the EJB are also identified. Therefore, all possible sets of {B, M, E} are identified and then stored, for example, in the form of a table in the database. The database is a relational database such as Oracle. In an embodiment of the present technique, the sets {B, M, E} are obtained at the time of deploying the application on an application server. The application server is suitably instrumented with code that makes use of a Java reflection Application Program Interface (API) to gather this information from each EJB.

The step of automatic injection 104 is performed based on, and follows the step of scanning. The injection is done during the run time of the application, and during which the application handles requests from a synthetic workload generator. The workload generator generates workloads of various 'close to real-life' operational characteristics to check the reliability of the application.

For injecting the exceptions at the corresponding interface points, a 'before advice' is used. The before advice is weaved into each corresponding interface point while deploying the application. In other words, the before advice is weaved in to each EJB method of the EJBs of the application. Weaving refers to injecting the before advice presented in the form of an 'aspect' into the interface points associated with the before advice. In other words, the before advice is modularized into the aspect. In general, the term aspect refers to a part of a software program, which cross-cuts across the core concerns of the program. The modularization is achieved by combining the before advice with a 'pointcut' expression. For this purpose, an aspect-oriented programming framework such as 'AspectJ' which provides context-aware constructs and is an aspect-oriented extension to the JAVA programming language is used. The pointcut specifies those interface point(s) that correspond to the execution of a particular EJB method of the EJB. In an embodiment of the present technique, the pointcut expression is set in such a way that for each EJB of the application, there is an instance of the aspect that includes the before advice. In other words, one aspect is applicable to the EJB class. Therefore, the before advice applies to all EJB methods of the EJB class. The aspect is a managed resource, and is developed as a JMX 'MBean'. The MBean includes attributes and methods. The attributes include name of the exception that is to be injected (E), name of the EJB method (M) in whose invocation the exception is to be injected, and the number of times the exception is to be injected (N). The MBean also includes a method called "startInject" which can be invoked by using a JAVA Management Extensions (JMX) interface, in order to begin the process of injection. Upon instantiation of the aspect, the aspect MBean registers with the JMX MBean Server. The aspect MBean registers with the MBean server with a unique name that corresponds to the name of the EJB that it has been weaved into. Registering under this uniquely identifiable name enables the MBean Server to locate the correct MBean instance when provided with the name of the EJB.

Figure 2:
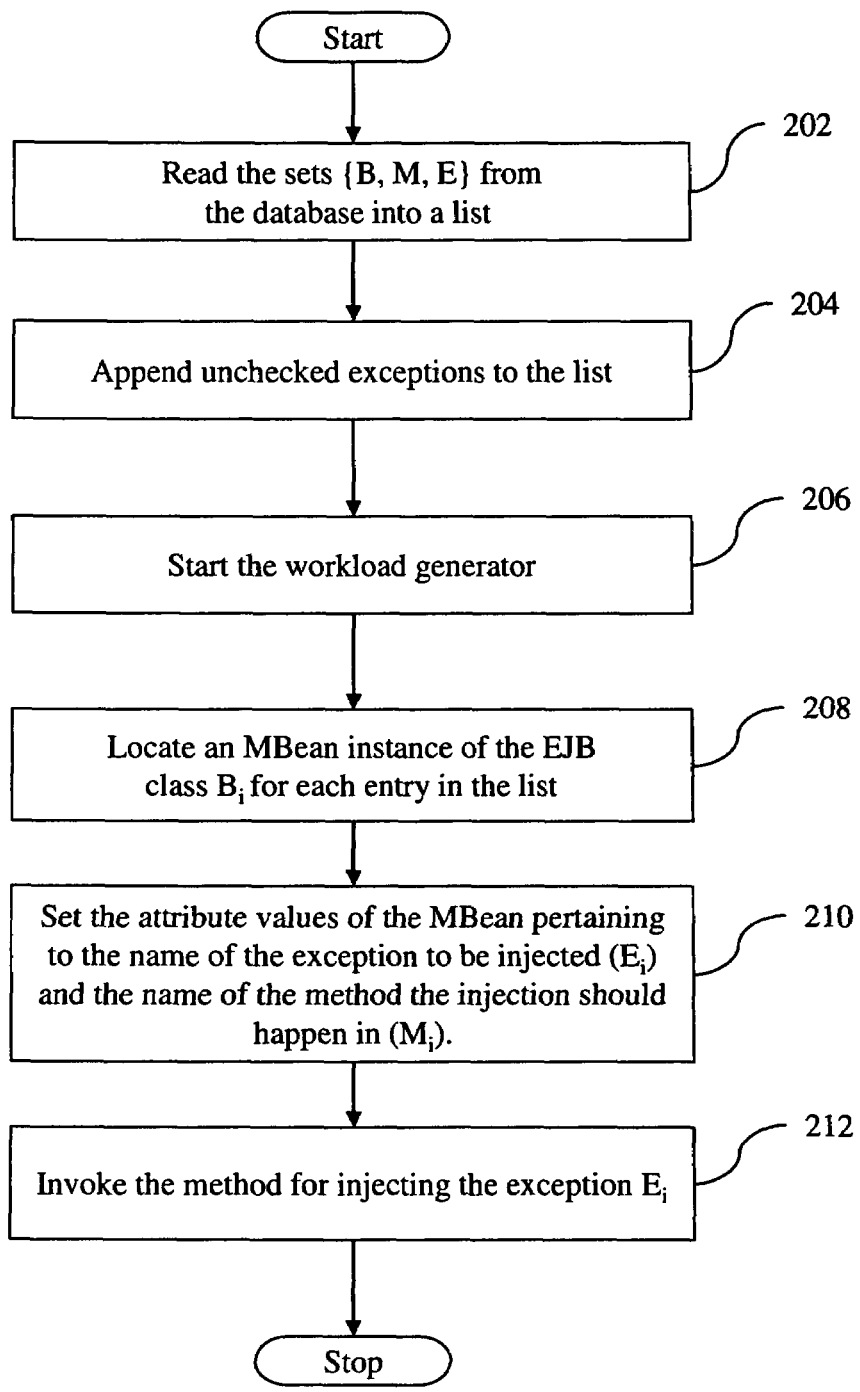
FIG. 2 is a flowchart depicting an exemplary method for automatically injecting exceptions during run time of an application in accordance with an aspect of the present technique.

FIG. 2 is a flowchart depicting an exemplary method for automatically injecting the exceptions during run time of the application. At step 202, the sets {B, M, E} are read from the database. In an embodiment of the present technique, the sets are read into a list. At step 204, corresponding to each EJB B and each method M of B, every unchecked exception (F) that is identified is appended to the list in the form of another set {B, M, F}. This results in an appended list denoted by {Bi, Mi, Ei}. At step 206, the workload generator is started. At step 208, for each entry in the appended list, an MBean instance of the EJB Bi is located. At step 210, the attribute values of the MBean are set pertaining to the name of the exception to be injected (Ei), and the name of the method the injection should happen in (Mi). The attribute N is set to 1. At step 212, the method for injecting the exception Ei, for example, StartInject is invoked on the MBean.

In an embodiment of the present technique, the injection is coordinated by a controller. The controller uses a JMX API to manage the aspect MBeans.

Figure 3:
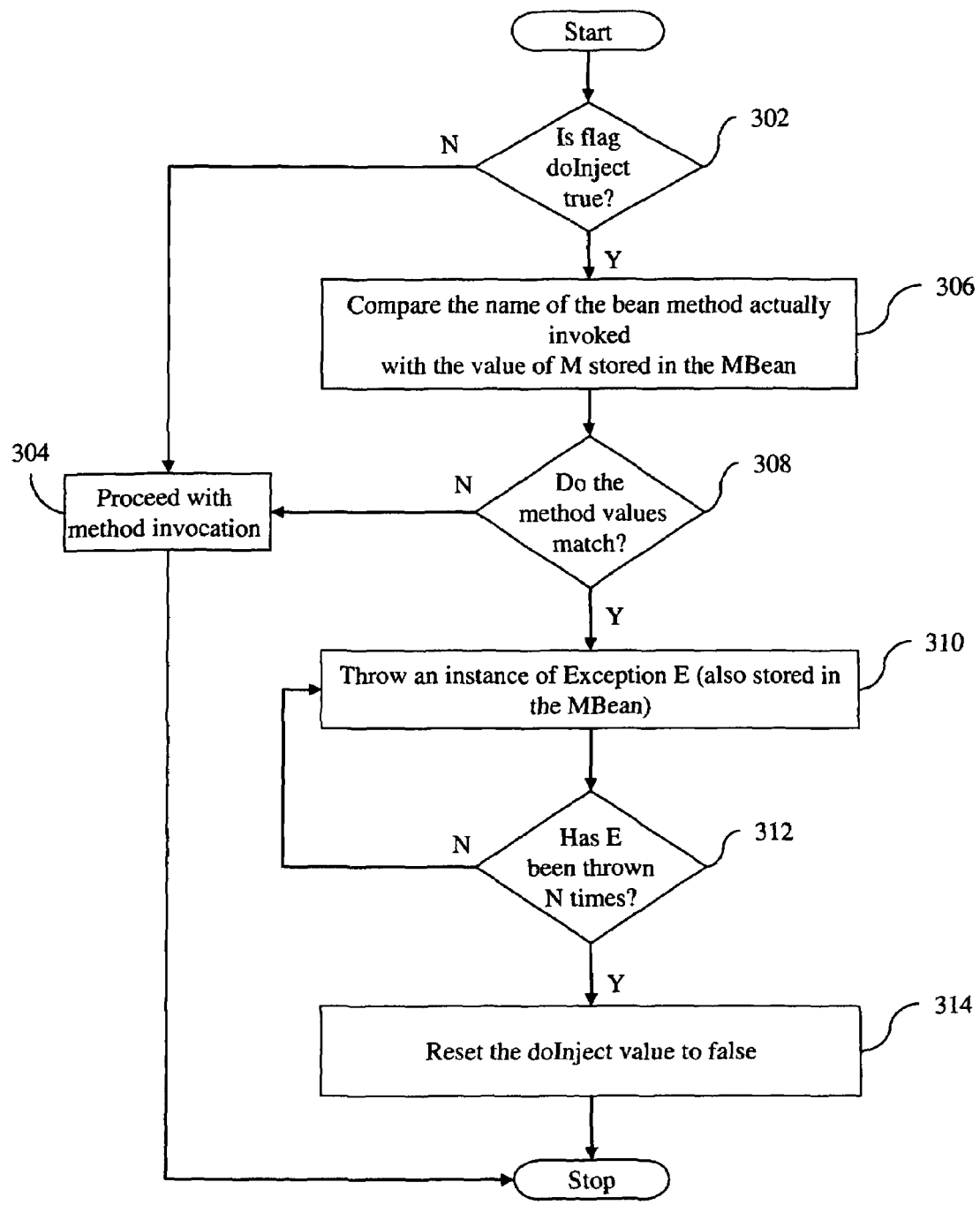
FIG. 3 is a flowchart depicting a sequence of steps for throwing an exception in accordance with an aspect of the present technique.

The exceptions that are injected at the corresponding interface points are thrown to at least one caller or invoker of the EJB method. For this purpose, the before advice code that is weaved into all the EJB methods is set to intercept the EJB method invocation. FIG. 3 is a flowchart depicting the sequence of steps for throwing the exception. At step 302, it is checked whether an internal Boolean flag 'doInject' is set to true. If the flag is not set to true, then at step 304, the intercepted EJB method invocation proceeds. However if the flag is set to true, at step 306, the name of the EJB method that has been invoked is compared with the value of M stored in the MBean. At step 308, it is checked whether the two EJB method values match. In case the two values match, then an instance of the exception E, which is also stored in the MBean is thrown at step 310, using the JAVA throws clause. In other words, the before advice interrupts the EJB method before the beginning of execution of the EJB method. This will cause the invoker of the method to receive the exception as if the exception occurred while the business logic of the method was running. Therefore, it appears to the invoker of the method that the exception actually occurred while executing the invoked method. However, if the two EJB method values do not match, the method invocation is allowed to pass through at step 304. At step 312, it is checked whether the exception E has been thrown N times. If the exception has not been thrown N times, the steps 310 and 312 are performed until the exception E is thrown for N times. Once the exception E is injected into the invocation of method M for N times, the doInject flag is reset or set to a 'false' value at step 314. Therefore, each exception is thrown a predetermined number of times.

Once the exceptions are thrown, the response of the application to the exceptions is analyzed. The analysis is performed using an 'around advice', which traces the execution path of the application at a component level. The around advice is modularized as an around advice aspect. The around advice aspect is weaved into the application server classes that are involved in handling the execution of a use case in the running application. This aspect collects data that is used to infer the application's response to the exceptions injected into it during the injection phase.

Figure 4:
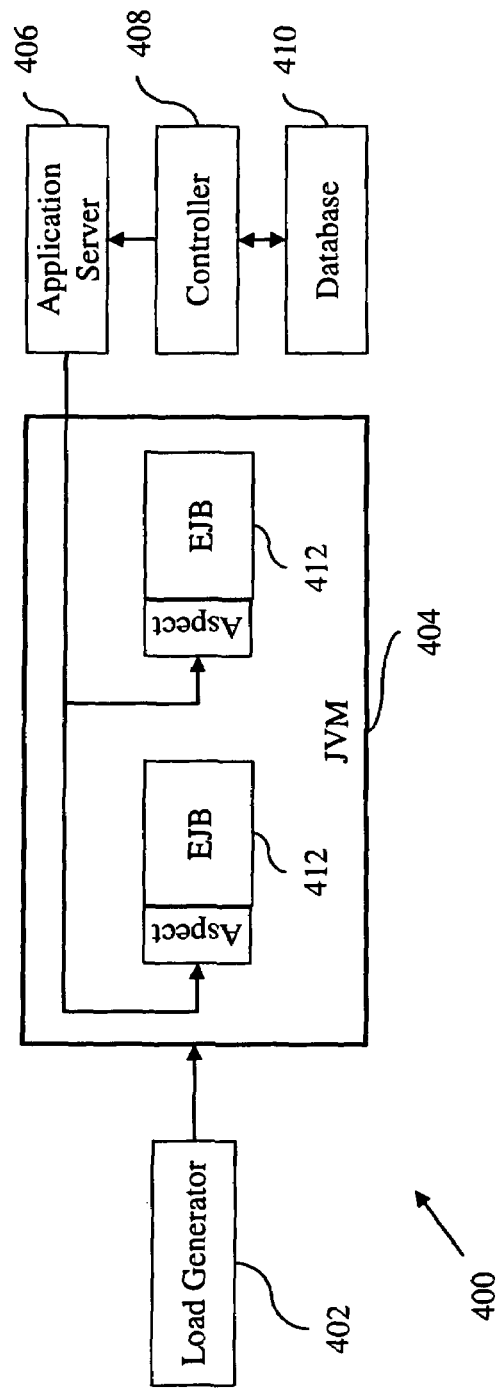
FIG. 4 is a block diagram of a system for injecting exceptions in accordance with an aspect of the present technique.

FIG. 4 is a block diagram of a system 400 for injecting exceptions. The system includes a load generator 402, a JVM 404, an application server 406, a controller 408, a database 410. The workload generator 402 generates workloads of various operational characteristics to check the reliability of the application. The EJBs of the application are loaded on the JVM 404 for execution. The before advice is weaved into each EJB 412 of the JVM in the form of the aspect by using AspectJ. The application server 406 deploys the JAVA enterprise application. The application server 406 makes use of the Java reflection API to gather the information from each EJB, as described earlier. The application server 406 further includes the around advice aspect for analyzing the response of the application to injection of exceptions. The controller 408 controls the injection of exceptions. The controller 408 includes the JMX API to manage the aspect MBeans. The database 410 stores the values of sets {B, M, E}, for example, in the form of a table.

The method and system for injecting exceptions as described in the present technique have the advantage that they allow the exception handling mechanisms of a particular J2EE application to be tested rigorously. This ensures that the application behavior on occurrence of an exception is reasonably expected.

The system for injecting exceptions, as described in the present technique or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the present technique.

The computer system comprises a computer, an input device, a display unit and/or the Internet. The computer further comprises a microprocessor. The microprocessor is connected to a communication bus. The computer also includes a memory. The memory may include Random Access Memory (RAM) and Read Only Memory (ROM). The computer system further comprises a storage device. The storage device can be a hard disk drive or a removable storage drive such as a floppy disk drive, optical disk drive, etc. The storage device can also be other similar means for loading computer programs or other instructions into the computer system. The computer system also includes a communication unit. The communication unit allows the computer to connect to other databases and the Internet through an I/O interface. The communication unit allows the transfer as well as reception of data from other databases. The communication unit may include a modem, an Ethernet card, or any similar device which enables the computer system to connect to databases and networks such as LAN, MAN, WAN and the Internet. The computer system facilitates inputs from a user through input device, accessible to the system through I/O interface.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present technique. The set of instructions may be in the form of a software program. Further, the software may be in the form of a collection of separate programs, a program module with a larger program or a portion of a program module, as in the present technique. The software may also include modular programming in the form of object-oriented programming. The processing of input data by the processing machine may be in response to user commands, results of previous processing or a request made by another processing machine.

While the following description is presented to enable a person of ordinary skill in the art to make and use the technique, and is provided in the context of the requirement for a obtaining a patent. The present description is the best presently-contemplated method for carrying out the present technique. Various modifications to the preferred embodiment will be readily apparent to those skilled in the art and the generic principles of the present technique may be applied to other embodiments, and some features of the present technique may be used without the corresponding use of other features. Accordingly, the present technique is not intended to be limited to the embodiment shown but is to be accorded the widest cope consistent with the principles and features described herein.

Many modifications of the present technique will be apparent to those skilled in the arts to which the present technique applies. Further, it may be desirable to use some of the features of the present technique without the corresponding use of other features.

Accordingly, the foregoing description of the present technique should be considered as merely illustrative of the principles of the present technique and not in limitation thereof.

What we claim is:

1. A method for injecting one or more exceptions into a JAVA enterprise application during execution of the JAVA enterprise application, the Java enterprise application having one or more Enterprise JAVA Beans (EJBs), each EJB including one or more EJB methods, the method comprising:
scanning, by an exception injecting computing device, each EJB for one or more exceptions, and corresponding interface points of the EJB;
automatically injecting, by the exception injecting computing device, the one or more exceptions at the corresponding interface points based on scanning the EJB, wherein a before advice aspect weaved into each corresponding interface point is used to automatically inject the exceptions;
throwing, by the exception injecting computing device, the exceptions to at least one invoker of the one or more EJB methods of the EJB, wherein the one or more exceptions are thrown before beginning execution of business logic of the one or more EJB methods; and
analyzing, by the exception injecting computing device, using an around advice aspect, a response of the JAVA enterprise application to the one or more exceptions that are injected into the JAVA enterprise application.

2. The method of claim 1, wherein scanning each EJB comprises:
determining, by the exception injecting computing device, a type of the one or more exceptions to be injected; and
determining, by the exception injecting computing device, one or more corresponding interface points at which the one or more exceptions are to be injected.

3. The method of claim 2, wherein determining the type of the one or more exceptions comprises identifying, by the exception injecting computing device, at least one of checked exceptions or unchecked exceptions, wherein identifying the checked exceptions comprises:
identifying, by the exception injecting computing device, the EJB (J);
identifying, by the exception injecting computing device, the one or more EJB methods (M) of the EJB, wherein the methods are included in a public interface of the EJB; and
identifying, by the exception injecting computing device, the checked exceptions (E) for each method of the EJB.

4. The method of claim 1, wherein the before advice is modularized into an MBean aspect, wherein the MBean aspect is managed by a JAVA Management Extension Application Program Interface (JMX API).

5. The method of claim 4, wherein the MBean aspect comprises:
a set of attributes configurable through the JMX API; and
at least one method for invocation by the JMX API.

6. The method of claim 5, wherein automatically injecting the exceptions comprises:
locating, by the exception injecting computing device, an MBean instance for each EJB of a list, wherein the list is derived from scanning each EJB;
setting, by the exception injecting computing device, values for the set of attributes corresponding to an exception to be injected, and the at least one invoker of the one or more EJB methods; and
invoking, by the exception injecting computing device, the at least one method.

7. The method of claim 1, wherein throwing the one or more exceptions comprises:
comparing, by the exception injecting computing device, a name of the one or more EJB methods with a corresponding attribute value, wherein the corresponding attribute value is stored in an MBean aspect; and
throwing, by the exception injecting computing device, the one or more exceptions from the MBean aspect to the at least one invoker of the one or more EJB methods based on comparing the name of the one or more EJB methods with the corresponding attribute value.

8. An exception injecting computing apparatus for injecting exceptions into a JAVA enterprise application during execution of the JAVA enterprise application, the Java enterprise application having one or more Enterprise JAVA Beans (EJBs), each EJB including one or more EJB methods, the device comprising:
one or more processors; and
a memory coupled to the one or more processors, the one or more processors configured to execute programmed instructions stored in the memory, the programmed instructions comprising:
scanning each EJB for one or more exceptions, and corresponding interface points of the EJB;
automatically injecting the one or more exceptions at the corresponding interface points based on scanning the EJB, wherein a before advice aspect weaved to each corresponding interface point is used to automatically inject the exceptions;
throwing the exceptions to at least one invoker of the one or more EJB methods of the EJB, wherein the one or more exceptions are thrown before beginning execution of business logic of the one or more EJB methods; and
analyzing, using an around advice aspect, a response of the JAVA enterprise application to the one or more exceptions that are injected into the JAVA enterprise application.

9. The apparatus of claim 8, wherein scanning each EJB comprises:
determining a type of the one or more exceptions to be injected; and
determining one or more corresponding interface points at which the one or more exceptions are to be injected.

10. The apparatus of claim 9, wherein determining the type of the one or more exceptions to be injected comprises identifying at least one of checked exceptions or unchecked exceptions, wherein identifying the checked exceptions comprises:
identifying the EJB (J);
identifying the one or more EJB methods (M) of the EJB, wherein the methods are included in a public interface of the EJB; and
identifying the checked exceptions (E) for each method of the EJB.

11. The apparatus of claim 8, wherein the before advice is modularized into an MBean aspect, wherein the MBean aspect is managed by a JAVA Management Extension Application Program Interface (JMX API).

12. The apparatus of claim 11, wherein the MBean aspect comprises:

a set of attributes configurable through the JMX API; and
at least one method for invocation by the JMX API.

13. The apparatus of claim 12, wherein automatically injecting the exceptions comprises:
   locating an MBean instance for each EJB of a list, wherein the list is derived from scanning each EJB;
   setting values for the set of attributes corresponding to an exception to be injected, and the at least one invoker of the one or more EJB methods; and
   invoking the at least one method.

14. The apparatus of claim 8, wherein throwing the one or more exceptions comprises:
   comparing a name of the one or more EJB methods with a corresponding attribute value, wherein the corresponding attribute value is stored in an MBean aspect; and
   throwing the one or more exceptions from the MBean aspect to the at least one invoker of the one or more EJB methods based on comparing the name of the one or more EJB methods with the corresponding attribute value.

15. A non-transitory computer-readable storage medium having stored thereon instructions for injecting exceptions into a JAVA enterprise application during execution of the JAVA enterprise application, the Java enterprise application having one or more Enterprise JAVA Beans (EJBs), each EJB including one or more EJB methods, the instructions comprising machine executable code which, when executed by at least one processor, causes the processor to perform steps comprising:
   scanning each EJB for one or more exceptions, and corresponding interface points of the EJB;
   automatically injecting the one or more exceptions at the corresponding interface points based on scanning the EJB, wherein a before advice aspect weaved to each corresponding interface point is used to automatically inject the exceptions;
   throwing the one or more exceptions to at least one invoker of the one or more EJB methods of the EJB, wherein the exceptions are thrown before beginning execution of business logic of the one or more EJB methods; and
   analyzing, using an around advice aspect, a response of the JAVA enterprise application to the one or more exceptions that are injected into the JAVA enterprise application.

16. The medium of claim 15, wherein scanning each EJB comprises:
   determining a type of the one or more exceptions to be injected; and
   determining one or more corresponding interface points at which the one or more exceptions are to be injected.

17. The medium of claim 16, wherein determining the type of the one or more exceptions to be injected comprises identifying at least one of checked exceptions or unchecked exceptions, wherein identifying the checked exceptions comprises:
   identifying the EJB (J);
   identifying the one or more EJB methods (M) of the EJB, wherein the methods are included in a public interface of the EJB; and
   identifying the checked exceptions (E) for each method of the EJB.

18. The medium of claim 15, wherein the before advice is modularized into an MBean aspect, wherein the MBean aspect is managed by a JAVA Management Extension Application Program Interface (JMX API).

19. The medium of claim 18, wherein the MBean aspect comprises:
   a set of attributes configurable through the JMX API; and
   at least one method for invocation by the JMX API.

20. The medium of claim 19, wherein automatically injecting the exceptions comprises:
   locating an MBean instance for each EJB of a list, wherein the list is derived from scanning each EJB;
   setting values for the set of attributes corresponding to an exception to be injected, and the at least one invoker of the one or more EJB methods; and
   invoking the at least one method.

21. The medium of claim 15, wherein throwing the one or more exceptions comprises:
   comparing a name of the one or more EJB methods with a corresponding attribute value, wherein the corresponding attribute value is stored in an MBean aspect; and
   throwing the one or more exceptions from the MBean aspect to the at least one invoker of the one or more EJB methods based on comparing the name of the one or more EJB methods with the corresponding attribute value.

* * * * *